United States Patent [19]

Shah et al.

[11] Patent Number: 4,536,839
[45] Date of Patent: Aug. 20, 1985

[54] MEMORY REQUEST ARBITRATOR

[75] Inventors: Hemen V. Shah, Carritos; Victor Mashikian, Santa Ana; John Seaton, San Jose; Gordon Keller, Danville, all of Calif.

[73] Assignee: MAI Basic Four, Inc., Tustin, Calif.

[21] Appl. No.: 363,589

[22] Filed: Mar. 30, 1982

[51] Int. Cl.³ .............................................. G06F 13/00
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,159,518 | 6/1979 | Draper et al. | 364/200 |
| 4,237,534 | 12/1980 | Felix | 364/200 |
| 4,257,095 | 3/1981 | Nadir | 364/200 |
| 4,281,381 | 7/1981 | Ahuja et al. | 364/200 |
| 4,314,335 | 2/1982 | Pezzi | 364/200 |
| 4,395,753 | 7/1983 | Comfort et al. | 364/200 |
| 4,402,040 | 8/1983 | Evett | 364/200 |
| 4,449,183 | 5/1984 | Flahive et al. | 364/200 |

Primary Examiner—Raulfe B. Zache

Attorney, Agent, or Firm—Amster, Rothstein & Engelberg

[57] ABSTRACT

A memory request arbitrator is provided for selecting one of a plurality of requesting devices, such as microprocessors, which may make a request to access a memory device common to the plurality of requestors. Requests from the devices are applied in common as a portion of an address to a read only memory, a priority sequencer providing another portion of the address. The read only memory provides a selection signal to the selected requestor. The priority sequencer is periodically updated to thereby change the priority of requestors such that priority is given to each of the requestors over time. The priority sequencer may be temporarily disabled to thereby allow a requestor a "back-to-back" memory access for a multi-cycle memory instruction. Finally, the initial state of the request lines is checked upon system start up to determine whether any of the request lines are unused. Only those request lines associated with presently operating requestors are able to provide request signals to the read only memory.

4 Claims, 5 Drawing Figures

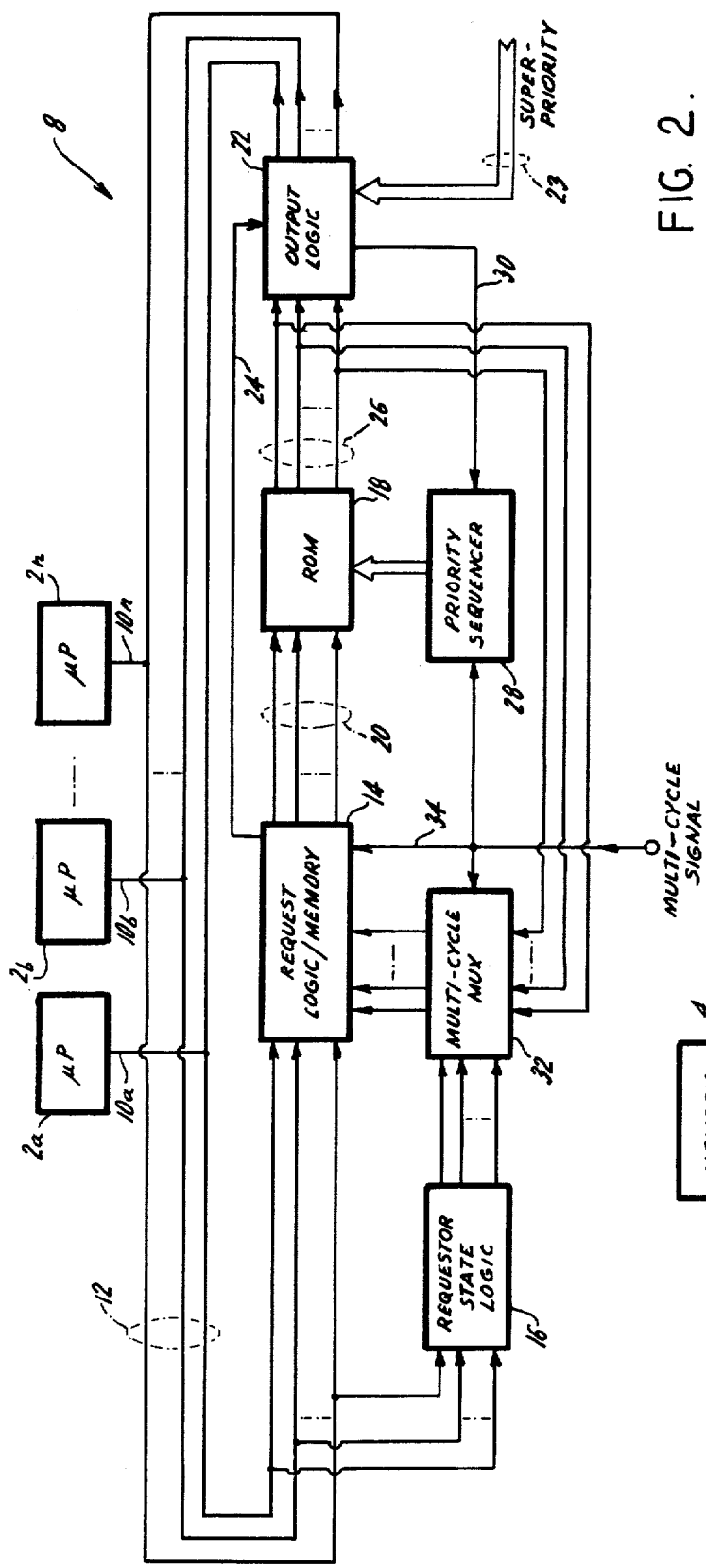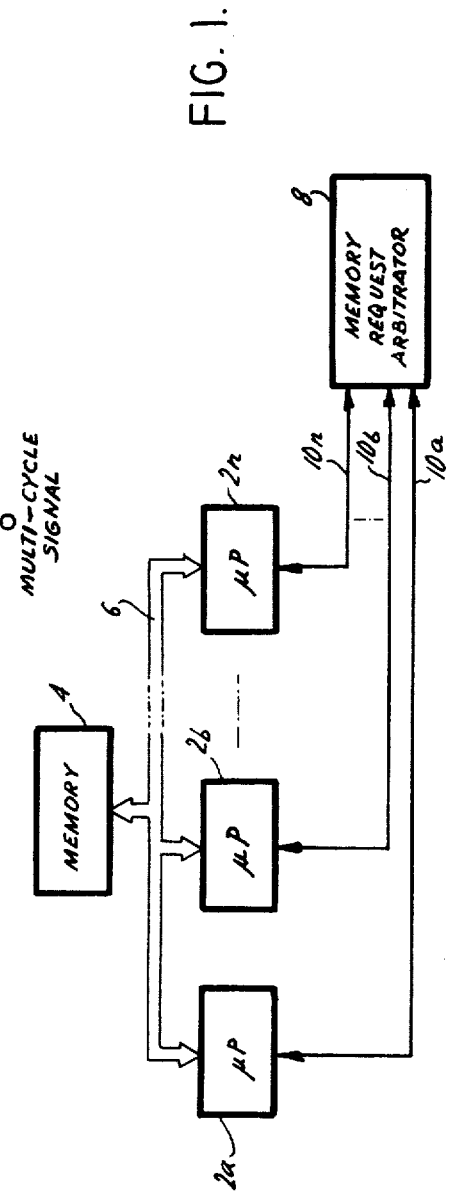
FIG. 1.
FIG. 2.

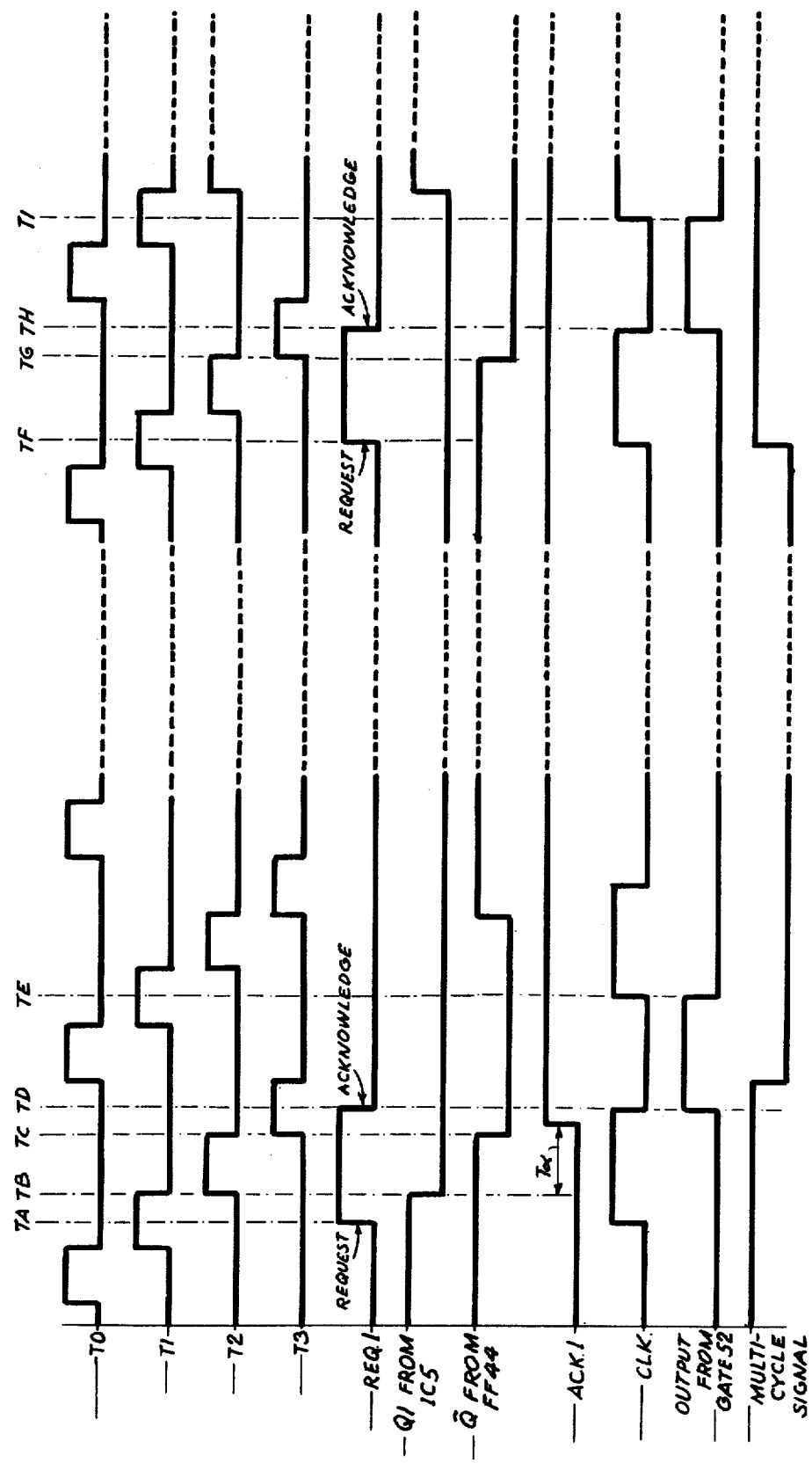

MEMORY REQUEST ARBITRATOR

DESCRIPTION OF THE INVENTION

The present invention relates to circuitry for use in a multiprocessing computer system for selecting one of a plurality of processors to communicate with a central memory device.

Multiprocessing techniques have become widely used in computing systems. Essentially, multiprocessing systems employ a plurality of processing devices operated substantially independent from one another to thereby enable the computing system to simultaneously accomplish a variety of different tasks.

Rather than provide each of the processers with a separate mass storage memory, multiprocessing systems generally employ a single mass storage device, such as core memory. Each of the processors in the multiprocessing system must therefore communicate with the single mass storage device when a memory instruction is to be performed by the associated processing system. Since a single memory may be accessed by a single requestor at any one time, a technique must be devised for choosing between two or more processors which desire to access the central memory at the same time.

Prior art techniques for selecting the processor have generally involved the use of discrete combinatorial and sequential logic elements and have therefore been highly complex and cumbersome in use. Further, such prior art techniques are relatively inflexible in operation, thus limiting the ability of such system to accommodate for particular contingency. For example, in many systems, the routine priority scheme may be upset by special memory requests, such as a multi-cycle request where the requesting processor requires a memory access involving more than a single memory cycle. Other special priority requests include "super priority" requests such as memory refresh cycles which must be performed to the exclusion of all other memory accesses. The prior art techniques employing discrete components cannot easily accommodate such non-routine memory requests without involving highly complex circuitry.

Additionally, it is important that priority assignments not be static in nature. That is, priorities should be rotated on a predetermined basis such that all requestors will be given an equal opportunity to access memory, assuming that such is desired. For example, if requestor 1 has priority over requestor 2 at all times, requestor 2 will clearly be given less opportunity with access memory compared to requestor 1. The priorities must therefore be rotated over time to effect an equal distribution among the requestors. This requires complex sequential logic when implemented in descrete form leading to a complex and cumbersome system.

Finally, in systems having a relatively large number of requestor lines, it is highly probable that one or more of the requestor lines will not be used by any of the requestors. It has been found that under certain conditions a requestor line which is not connected to a requestor may temporarily be mistaken as a requesting processor. Acknowledgement of such "spurious" requests results in wasted memory time and overhead.

It is therefore an object of the present invention to overcome the difficulties encountered in the prior art requestor selecting devices.

It is a further object of the present invention to provide a memory request arbitrator which provides rapid and flexible selection of one of a plurality of requestors which desire to access a central memory device.

It is a further object of the present invention to provide a memory request arbitrator which employs a read only memory to provide the selection of one of a plurality of requestors which desire to access a central memory device.

It is a further object of the present invention to provide a memory request arbitrator which provides a rotating priority whereby all requestors of equal priority will be given an equal opportunity over time to access the central memory device.

It is a further object of the present invention to provide a memory request arbitrator which can readily adapt to provide special memory requests such as multi-cycle memory request, "super priority" requests, and the like.

It is a further object of the present invention to provide a memory request arbitrator which automatically maintains a list of the plurality of requestors which are currently used in the system, the system automatically disabling all request lines for any requestors which are not currently used in the system.

In accordance with a the invention, apparatus is provided for selecting one of a plurality of requestors which may make a request to access a memory common to the requestors, the apparatus including circuitry for changing the priority among requestors such that priority is given to each of the plurality of requestors over time. In a specific embodiment of the invention, sequencing circuitry is provided to produce a sequence output indicating which of the requestors has priority over other of the requestors. A selection device receives the signal output and request signals from the requestors, and provides a selection signal in response thereto to the selected one of the requestors in accordance with a predetermined input/output function. The circuitry for changing the priority among requestors updates the sequencing circuitry to thereby provide priority to each of the plurality of requestors over time.

More specifically, the selection circuitry may include a programmable memory device having an address input for receiving an address comprised of the request signals from the requestors and the sequence output from the sequencing circuitry. The programmable memory device has a data output for providing the selection signal to the selected one of the requestors in accordance with a programmed input/output function. The circuitry for updating the sequencing device increments the sequencing device to sequentially change the address applied to the memory device to thereby provide priority to each of the plurality of requestors over time.

In accordance with another specific embodiment of the invention, apparatus for selecting one of a plurality of requestors which may make a request to access a memory common to the requestors includes circuitry for selectively changing the priority among requestors such that priority is given to each of the plurality of requestors over time, the circuitry for selectively changing maintaining priority among the requestors unchanged for a predetermined amount of time upon command of one of the requestors, whereby the one of the requestors may be assured of at least two successive accesses to the memory. More specifically, the circuitry for selectively changing the priority includes a sequencing circuit providing a sequence output indicating which of the requestors has priority over other of the requestors. A selection device receives the sequence output and request signals from the requestors for providing a selection signal to a selected one of the requestors in accordance with a predetermined input/output function. Circuitry is provided for (i) updating the sequencing circuitry whereby priority is given to each of the plurality of requestors over time, and for (ii) preventing the sequencing circuitry from being updated upon demand of one of the requestors whereby the one of the requestors may be assured of at least two consecutive accesses to the memory.

In accordance with still another specific embodiment of the invention, apparatus for selecting one of a plurality of requestors which may make a request to access a memory common to the requestors includes a request/acknowledge bus having a plurality of request/acknowledge lines each associated with one of the requestors. A plurality of gates each receives an associated one of the request/acknowledge lines at first inputs thereof. A storage device is provided for storing a plurality of state signals each associated with an associated one of said plurality of request/acknowledge lines indicating whether the associated request/acknowledge line is active or inactive. Circuitry is provided for applying the plurality of state signals to second inputs of associated ones of the gates, whereby the gates are enabled to produce request signals at outputs thereof from only those gates receiving active state signals from the storage device. Circuity is further provided for receiving the request signals and for providing acknowledge signals in response thereto. The circuitry for applying the plurality of state signals to second inputs of the gates includes a multiplexer receiving the plurality of state signals at first inputs thereof and the acknowledge signals at second inputs thereof. The multiplexer functions to apply one of the state signals and the acknowledge signals to the plurality of gates under the control of a multi-cycle signal such that only the gate associated with an acknowledge signal may subsequentially be enabled to produce request signals when the multi-cycle signal is present.

In another embodiment of the invention, apparatus for selecting one of a plurality of a requestors which may make a request to access a memory common to the requestors includes a request/acknowledge bus having a plurality of request/acknowledge lines each associated with one of the requestors. Requestor state circuitry is provided for receiving and storing request signals from the requestors by way of the request/acknowledge line. Sequencing circuitry is provided for producing a sequence ouput indicating which of the requestors has priority over other of the requestors. A programmable memory is provided and has an address input for receiving an address comprised of the stored request signals and the sequence output. The memory has a data output for providing an acknowledge signal to the request/acknowledge line associated with a selected one of the requestors in accordance with a programmed input/output function. In this manner, one of the request signals and the acknowledge signal are produced on the same request/acknowledge line. Circuitry for incrementing the sequencing circuitry is further provided to sequentially change the address whereby priority is given each of the plurality of requestors over time.

These and other objects of the invention will be discussed in detail with reference to the following drawing figures of which:

FIG. 1 is a block diagram illustrating the arrangement of a multiprocessing system employing a central memory, a plurality of microprocessors, and a memory request arbitrator for coupling a selected microprosessor to the memory in accordance with the invention;

FIG. 2 is a block diagram providing details of the construction of the memory request arbitrator illustrated in FIG. 1;

FIG. 4 is a waveform diagram helpful in understanding the operation of the memory request arbitrator shown in FIGS. 3A and 3B.

Figure 3A:
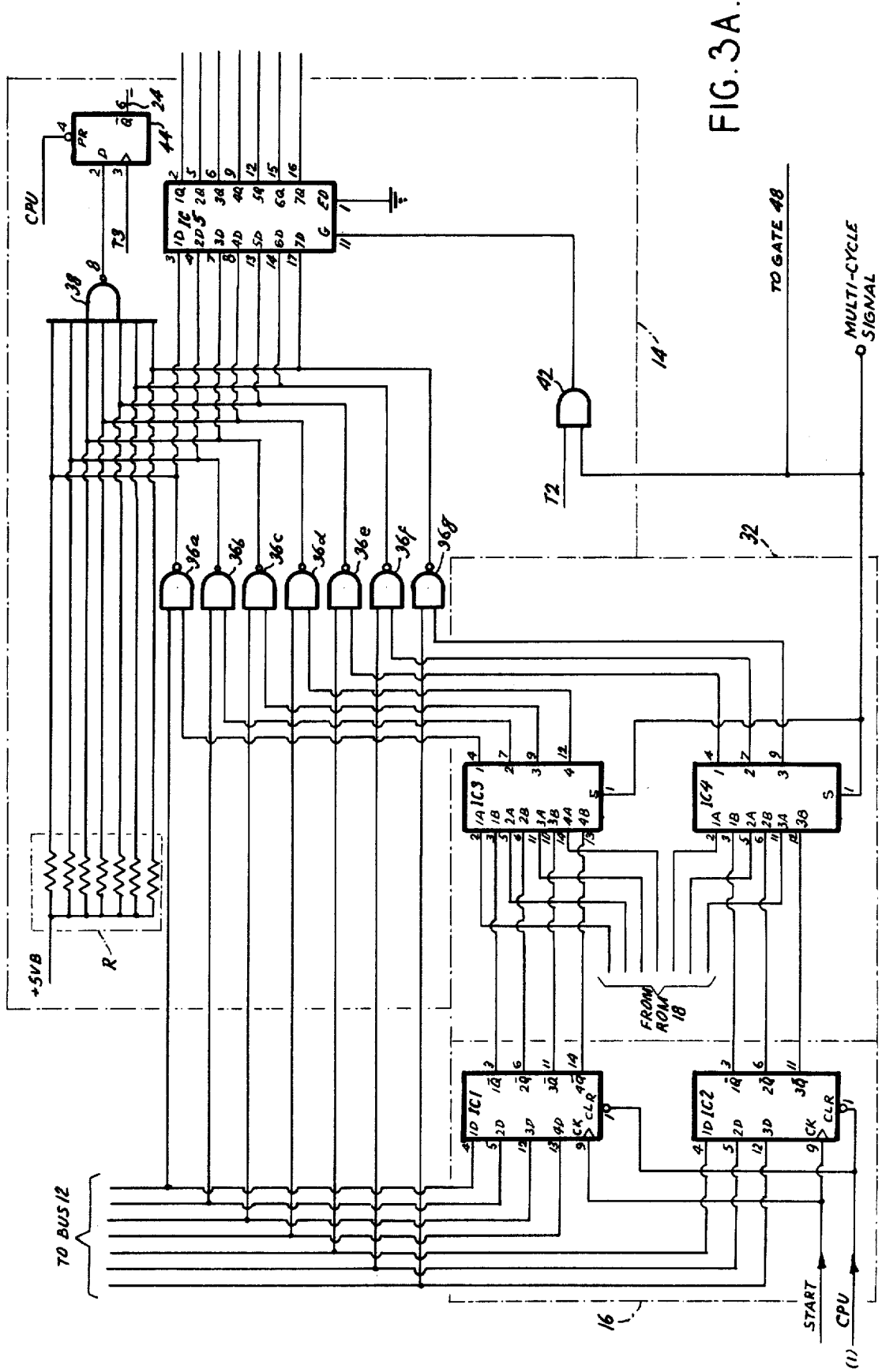
FIGS. 3A and 3B are schematic diagrams illustrating specific circuitry of each of the portions of the memory request arbitrator illustrated in FIG. 2.

With reference to FIG. 1, a multiprocessing system is illustrated as having a plurality of microprocessors 2a-2n, each individually accessing central memory 4 via memory bus 6. In accordance with the present invention, each of the microprocessors 2a-2n communicate with a memory request arbitrator 8 via an associated one of request/acknowledge lines 10a-10n. It should be understood that microprocessors in a multiprocessing system are used as examples of requestors which may employ the memory request arbitrator. Other requesting devices, such as input/output devices, are equally applicable to the present invention. Thus, the term "requestor" will herinafter be used to generally identify a requesting device.

Generally, only one of the plurality of requestors 2a-2n may access central memory 4 at any given time. Thus, when two or more of the requestors request a memory access for the same memory cycle, the conflict between the two or more requestors must be resolved. Memory request arbitrator 8 receives a request signal from the associated requestor via one of the associated request/acknowledge lines 10a-10n, and in accordance with a variable but predetermined priority scheme, memory request arbitrator 8 returns a single acknowledge signal to the selected requestor via one of the acknowledge/request lines 10a-10n.

The contents of memory request arbitrator 8 will be discussed with reference to FIG. 2. Each of the requestors 2a-2n is connected to an associated one of a plurality of lines in request/acknowledge bus 12 via the respective request/acknowledge line 10a-10n. The signals on request/acknowledge bus 12 are applied on the one hand to request logic/memory 14 and on the other hand to requestor state logic 16, the latter of which provides first inputs to multi-cycle multiplexer 32. Request logic/memory 14 provides a plurality of signals to read only memory 18 via request bus 20, and an enabling signal to output logic 22 via signal line 24. The output of ROM 18 is applied to output logic 22 via acknowledge bus 26. Output logic 22 in turn provides n output signals to the associated n lines on request/acknowledge bus 12, and also supplies a clock signal to priority sequencer 28 via signal line 30. Priority sequencer 28 provides a portion of the address applied to ROM 18. The acknowledge signals on acknowledge bus 26 are applied to second inputs of the multi-cycle multiplexer 32, which in turn provides outputs to request logic/memory 14. A multi-cycle signal is applied to request logic/memory 14, priority sequencer 28 and multi-cycle multiplexer 32. Finally, "super priority"

signals may be applied to output logic 22 via super priority bus 23.

The operation of memory request arbitrator 8, which will be described in full detail with reference to FIGS. 3A, 3B and 4, will now be briefly described with reference to FIG. 2. During the initial system turn-on, each of the requestors 2a-2n pulls each associated request-/acknowledge line 10a-10n low, to thereby provide a low signal to the requestor state logic 16. Thus, low signals are available from each of the used request/acknowledge lines, the unused lines remaining in a high state. Once all transients have died out and steady state is achieved, the states of the signals are strobed into a latch circuit to thereby preserve the used or unused state of the particular request/acknowledge line. The respective states on the request/acknowledge lines are inverted in the latch and applied to the multi-cycle multiplexer 32 which functions to normally provide the output from the requestor state logic 16 to the request logic/memory 14. Normally, the signals on request/acknowledge lines 10a-10n are at a low state, but when one or more of the requestors 2a-2n makes a request to access memory 4, it provides a high signal level on the associated request/acknowledge line. Request logic/memory 14 functions to receive and retain the request signal only for those request/acknowledge lines 10a-10n which correspond to a requestor which is an active part of the system, as determined from the state of requestor state logic 16. That is, only those requests corresponding to active requestors as determined from the initial low signal state will be applied to the remaining circuitry for further processing.

Thus, all requests from active requestors appear on one of the lines in request bus 20, the latter of which provides a portion of the address applied to ROM 18. The remaining portion of the address applied to ROM 18 is received from priority sequencer 28 which keeps track of the current priority in a predetermined sequence of priorities.

ROM 18 and priority sequencer 28 function to select one of the requestors by employing a rotating priority technique. More specificially, at any given time, a selected one of the requestors 2a-2n is given priority, and if that requestor requests a memory access, that requestor will be selected regardless of whether any other requestors are requesting a memory access. If the requestor which is currently given priority is not requesting a memory access, the closest succeeding requestor which is requesting a memory access will be granted access to memory. That is, if requestor 2a is given priority, but does not request a memory access, and if requestor 2b is requesting a memory access, such access will be granted regardless of the states of the requestor succeeding requestor 2b. In the event that neither requestor 2a nor 2b are requesting a memory access, the next succeeding requestor 2c, will be granted access if it requests such, and so on.

During the next memory cycle, the priority sequencer 28 increments the portion of the address supplied to ROM 18 to thereby "rotate" the priority from requestor 2a to requestor 2b. If requestor 2b is making a request as determined from request logic/memory 14, it will be selected. If not, requestor 2c will be selected if requesting access, and the selection process continues as described above. At the end of the second memory cycle, the priority sequencer is again incremented to thereby cause the next requestor to have the highest priority. In this manner, requests from any of the requestors 2a-2n will be given equal priority over a given amount of time, since the priority rotates from requestor to requestor.

ROM 18 provides an acknowledge signal on the particular line in acknowledge bus 26 which is associated with the selected requestor. The acknowledge signal is applied to output logic 22, which in turn functions to apply the acknowledge signal to the associated line in the request/acknowledge bus 12, when enabled by request logic 14 via signal line 24, and when no super priority signals exist on bus 23. The acknowledge signal from output logic 22 changes the state of the associated line in acknowledge/request bus 12 from a high signal level (request) to a low signal level (acknowledge). The selected requestor can determine that it has been selected by noting the change from a high signal level to a low signal level on its request/acknowledge line.

In the event of a super-priority request such as a memory refresh request or other high priority operation requiring an immediate memory access, signals on super-priority bus 23 act to inhibit the application of any acknowledge signals to request/acknowledge bus 12.

The memory request arbitrator 8 according to the invention can provide a selected requestor with a "back to back" memory access to allow for multi-cycle requests. Specifically, a memory request may require more than one memory cycle for a complete memory operation. When such is the case, the selected requestor produces a multi-cycle signal shortly after being selected, and provides this multi-cycle signal to request logic/memory 14, priority sequencer 28, and multi-cycle multiplexer 22, via signal line 34. In response to the multi-cycle signal, the multi-cycle multiplexer functions to apply the acknowledge signals from ROM 18 on acknowledge bus 26 to the request/logic memory 14, to thereby enable only that request line having the acknowledge signal present on bus 26, namely the chosen requestor. Thus, in a subsequent memory cycle, only the request from the previously chosen requestor will propagate to request bus 20, to thereby insure that the previously chosen requestor will again be chosen for the remaining cycle(s) in the multiple memory cycle instruction. The multi-cycle signal on line 34 is also applied to request/logic memory 14 to control the latch therein, and to priority sequencer 28 to insure that the priority sequence is not incremented during the multiple memory cycle instruction.

Details of each of the functional blocks illustrated in FIG. 2 will now be discussed with reference to FIGS. 3A and 3B. The embodiment of the invention illustrated in FIGS. 3A and 3B is designed to accommodate up to seven requestors. However, other numbers of requestors may easily be accommodated using the same techniques described with reference to the FIG. 3A and 3B embodiment.

Seven request lines taken from request/acknowledge bus 12 are applied to requestor state logic 16 and to request logic/memory 14. Requestor state logic 16 comprises IC1 and IC2, each of which may be comprised of a 74LS175 Quad D Flip-flops with clear, manufactured by Texas Instruments, for example. The seven request lines are applied to the D inputs at pins 4, 5, 12 and 13 of IC1 and pins 4, 5 and 12 of IC2. The outputs of each of the flip-flops are taken from the inverted state outputs thereof at pins 3, 6, 11, and 14 of IC1, and 3, 6, and 11 of IC2. The flip-flops in IC1 and IC2 are cleared upon a command from the CPU applied to pin 1 of IC1 and IC2, and a system START signal provides a clock for the flip-flops at pin 9 of IC1 and IC2.

The outputs from IC1 and IC2 are applied in parallel to multi-cycle multiplexer 32, the signals corresponding to the first through seventh requestors being applied to pins 3, 6, 10, and 13 of IC3, and to pints 3, 6, and 10 of IC4, respectively. IC3 and IC4 may each comprise a Quad 2-Line to 1-Line Data Selector/Multiplexers, such as the 74S157 manufactured by Texas Instruments, for example. The other inputs applied to pins 2, 5, 11, and 14 of IC3 and to pins 2, 5, and 11 of IC4 are acknowledge signals taken from the output of ROM 18 as will be discussed in more detail below. IC3 and IC4 function to apply the signals from either IC1 and IC2 or from ROM 18 to the request logic/memory 14 under the control of a multi-cycle signal applied to pin 1 of IC3 and IC4. The outputs corresponding to requestors 1 through 7 are taken from pins 4, 7, 9, and 12 of IC3 and from pins 4, 7, and 9 of IC4 respectively.

The request logic/memory 14 includes NAND GATES 36a-36g, resistor network R, NAND gate 38, AND gate 42, integrated circuit IC5 and D type flip-flop 44. IC5 may be the 74S373 Octal D-Type Latch, manufactured by Texas Instruments, for example. Each of the request signals from request/acknowledge bus 12 are applied to the first input of a respective NAND gates 36a-36g, the second inputs of the NAND gates receiving an associated output from the multi-cycle multiplexer 32. The outputs of NAND gates 36a-36g are applied to a seven input NAND gate 38, the inputs to NAND gate 38 also being applied to the 5 volt supply via an individual resistor in resistor network R. The output of NAND gates 36a-36g are also applied to pins 3, 4, 7, 8, 13, 14, and 17 of IC5 which operates to latch the signal levels applied thereto under the control of a signal applied to pin 11 of IC5. The latched contents of IC5 are available on output pins 2, 5, 6, 9, 12, 15 and 16, and are provided on request bus 20. The control signal applied to pin 11 of IC5 is derived from AND gate 42 which receives at a first input a positive going pulse at time T2, and at a second input the multi-cycle signal. The output of NAND gate 38 is applied to the delay input of flip-flop 44, the inverted output of which provides signal line 24. Flip flop 44 is clocked by a pulse at time T3.

Figure 3B:
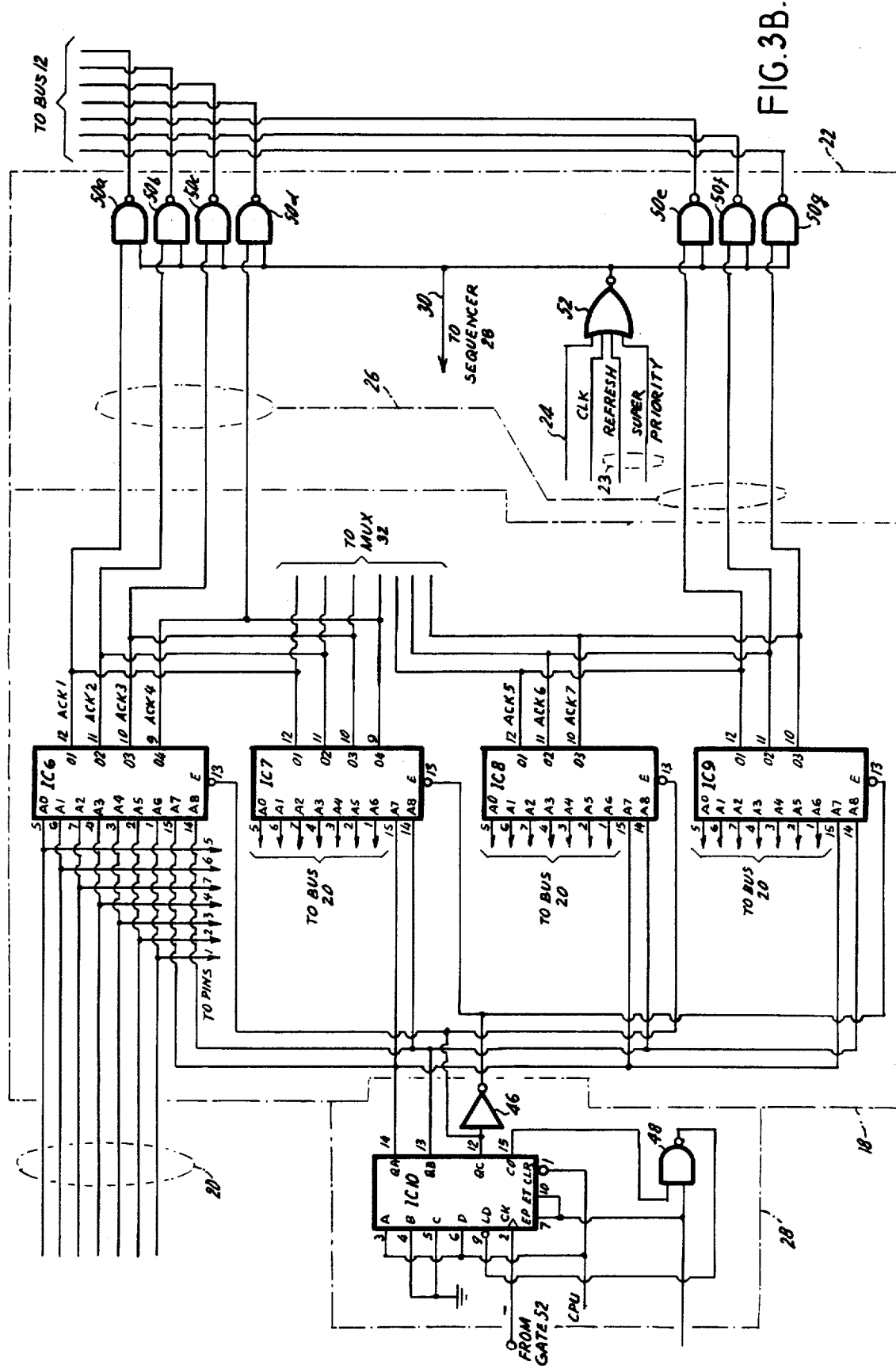

The ROM 18, FIG. 3B, receives the 7 outputs from the request logic/memory 14 via request bus 20. ROM 18 comprises four programmable read only in memories PROMs IC6-IC9. Each of the PROMs is a 512×4 PROM such as the 82S131 manufactured by Texas Instruments, for example. A 9 bit address is applied to pins 5, 6, 7, 4, 3, 2, 1, 15 and 14, pin 5 corresponding to the least significant address bit A0, pin 14 corresponding to the most significent address bit A8. The seven request lines in request bus 20 are applied as address bits A0-A6 in each of the four PROMs. Priority sequencer 28 provides address bits A7 and A8 for each of the four PROMs. Two of the four PROMs are selectively enabled at any given time under the control of priority sequencer 28 which provides signals to the enable input of each of the PROMs at pin 13. The 4 bit output from IC6 and IC7 taken from pins 12, 11, 10, and 9, along with the three bit output from IC8 and IC9 taken from pins 12, 11, and 10 combine to form the 7 acknowledge signals ACK1-ACK7, and are applied to acknowledge bus 26.

Priority sequencer 28 comprises an integrated circuit IC10 such as the 74S163 Synchronous 4 Bit Counter manufactured by Texas Instruments, for example. The pre-set input pins 3, 4, 5 and 6 corresponding to counter bits A-D, respectively, are pre-set to a count of 9 (1001) by applying pins 4 and 5 to ground and by providing a high signal level to pins 3 and 6 from the CPU. Priority Sequencer 28 also includes an inverter 46 and a NAND gate 48, the output of a latter providing a LOAD signal to pin 9 of IC10. Output logic 22 provides a clock signal to pin 2 of IC10 via signal line 30. The clear input for IC10 pin 1 is not used. This pin is tied to a CPU signal which is a pull-up signal tied to +5 V through a resistor (R) as shown in FIG. 3A. The multi-cycle signal is applied to enable pins 7 and 10 of IC10 and to a first input of NAND gate 48, the second input of which receives the ripple carry output from pin 15 of the counter. The least significant bit of the counter in IC10, namely QA at pin 14, is applied to address bit A7 at pin 15 of each of the four PROMs in ROM 18. The next least significant bit, QB from pin 13 of IC10 is applied to address bit A8 at pin 14 of the four PROMs in ROM 18. The next bit in the counter, QC, is applied directly to the enable inputs of IC6 and IC8, while QC from pin 12 of IC10 is applied to the enable inputs of IC7 and IC9 via inverter 46.

Output logic 22 includes NAND gates 50a-50g, each of which receives one of the acknowledge signals at a first input thereof. The output of NOR gate 52 provides the other input to NAND gate 50a-50g. At least four signals are applied to the inputs of NOR GATE 52, the first of which is taken from signal line 24 from flip-flop 44 in request logic/memory 14. The second input signal is a clock signal. The third and fourth signals are provided on the super-priority bus 2 3 and include signals which are allowed to overide any request from any of the requestors 2a-2n. Specifically, the third signal applied to NOR GATE 52 is a memory refresh request designed to enable to a refresh cycle for memory 4. The fourth signal is simply termed a "super priority" signal which may be provided by a special requestor requiring the highest priority at all times. Although two signals are illustrated as being provided on the super-priority bus 23 in accordance with this embodiment of the invention, additional signals may be provided as desired in order to provide a priority for certain requestors which is higher than that of requestors 2a-2n. The output of NOR gate 52 is also applied to the clock input of IC10 in priority sequencer 28 via signal line 30.

The operation of the memory request arbitrator according to the embodiment of the invention illustrated in FIGS. 3A and 3B will be described with further reference to FIG. 4 and Tables 1-8.

Each of the request/acknowledge lines 10a-10n from the requestors are normally pulled high to the supply voltage via a resistance. Therefore, until these request lines are pulled low, they normally stay high. During the power on time, each of the requestors 2a-2n functions to pull its corresponding request/acknowledge line low, all unused request/acknowledge lines remaining in a high state. During the power-on time, after all transients have died out and the system is in steady state, a pulse is applied on the START line to provide a clock signal to pin 9 of IC1 and IC2. Thus, a low signal level corresponding to each request/acknowledge line which is presently being used in the system is latched into IC1 and IC2. The clear input pin 1 of IC1 and 2 is not used. These pins are pulled high connecting them to +5 V through a Resistor—R. After receiving the START pulse, the inverted state outputs from IC1 and IC2 are high for each of the request/acknowledge lines corresponding to an operating requestor.

The outputs of IC1 and IC2 are applied to the B inputs of multiplexers IC3 and IC4, the A inputs of the multiplexers receiving acknowledge signals ACK-1–ACK7 from ROM 18. IC3 and IC4 function to apply either the signals applied to the A inputs of the multiplexers or the B inputs of the multiplexers to request logic/memory 14, depending upon the state of the multi-cycle signal applied to the select line at pin 1 of IC3 and IC4. Assuming that the multi-cycle signal is normally high, multiplexers IC3 and IC4 normally apply the B input signals from requestor state logic 16 to request logic/memory 14.

After the system start up, only those NAND gates 36a–36n having a high signal applied to the first input of the gates from multi-cycle multiplexer 32, corresponding to the active requestors, are enabled to pass any signals to the remaining circuitry for further processing. In this manner, an spurious change of state on an acknowledge/request line corresponding to an inactive requestor will not pass its associated NAND GATE. Valid requests on the other hand, appear on the request-/acknowledge bus 12 as a high signal on the associated request/acknowledge line. The high signal from the requestor propagates through the associated one of NAND gates 36a–36g to NAND gate 38 and integrated circuit IC5 as a low going signal. Therefore, if any requests are made, the low going signal from the associated NAND gate causes the associated output from IC5 to go low at a time determined by NAND gate 42, which provides a gate signal to IC5 and which is controlled by clock pulses at time T2 and the multi-cycle signal. That is, if requestors 1 and 3 (corresponding to NAND gates 36a and 36c) request a memory access for the same memory cycle, the 1Q and 3Q outputs from IC5 go to low at time T2.

Further, when one or more of the outputs of NAND gates 36a–36g are drawn low, one of the normally high inputs to NAND gate 38 is drawn low to thereby provide a high signal level to the D input of flip-flop 44. The Q̄ output from pin 6 of flip-flop 44 attains a low value in response to the high level applied to the D input at the T3 clock pulse applied to the flip-flop.

Assuming that requestors 1 and 3 request a memory access during the same memory cycle, lines 1 and 3 on request bus 20 will be drawn low. Since the individual lines in request bus 20 provide address bits for ROM 18, ROM 18 can determine which of the requestors is presently requesting to access memory and provides an acknowledge signal to one of the requestors based on the current priority. The current priority is determined in priority sequencer 28 which includes a counting integrated circuit IC10 which functions to count from 9(1001 to 15(1111). The counter is initially loaded to a count of 9 since pins 3 and 6 are pulled high and pins 4 and 5 are grounded. The carry output signal from pin 15 of IC10 produced when the count in IC10 reaches 15, is provided to the load input of IC10 via NAND GATE 48 to thereby load the count of IC10 to 9. IC10 receives its clock input from NOR gate 52, the count in IC10 being incremented by negative going transitions of GATE 52.

The request lines on request bus 20 provide address bits A0–A6 for PROM'S IC6–IC9 in ROM 18, address bits A7 and A8 in IC6–IC9 being taken from the QA and QB counter state outputs from IC10, respectively, QA corresponding to the least significant bit of the counter. The QC state from the counter is directly applied to the enable inputs of IC6 and IC8, and applied to the enable inputs of IC7 and IC9 via inverter 46 to thereby select either IC6/IC8 or IC7/IC9 for any particular priority.

Priority "1" is herein defined as the memory cycle which provides the highest priority to requestor 1, priority "2" as the cycle having requestor 2 as the highest priority, and so on. With reference to Table 1, it can be seen that for priority "1", a count of 9 will be produced by IC10, thus leading to the state outputs for QD–QA as shown. By virtue of the low state of QC, IC6 and IC8 will be enabled, and IC7 and IC9 will be disabled, as indicated by "x". Address bits A8 and A7 will take the states of QB and QA, namely 0 and 1, respectively. For priorities 2 and 3, IC6 and IC8 are enabled, and address bits A8 and A7 take the states of "1,0" and "1,1" respectively. For priorities 4–7, IC7 and IC9 are enabled, IC6 and IC8 being disabled. As above, address bits A8 and A7 take the states of QB and QA.

TABLE 1

| Priority | QD | Q̄C | QC | QB | QA | IC6/IC8 | IC7/IC9 | A8 | A7 |
|---|---|---|---|---|---|---|---|---|---|
| 1 | 1 | 1 | 0 | 0 | 1 | x |   | 0 | 1 |
| 2 | 1 | 1 | 0 | 1 | 0 | x |   | 1 | 0 |
| 3 | 1 | 1 | 0 | 1 | 1 | x |   | 1 | 1 |
| 4 | 1 | 0 | 1 | 0 | 0 |   | x | 0 | 0 |
| 5 | 1 | 0 | 1 | 0 | 1 |   | x | 0 | 1 |
| 6 | 1 | 0 | 1 | 1 | 0 |   | x | 1 | 0 |
| 7 | 1 | 0 | 1 | 1 | 1 |   | x | 1 | 1 |

IC6–IC9 function to provide a "rotating" priority for the requestors. Briefly, for any given memory cycle, one of the requestors will be given priority over all others. For example, if during the first memory cycle, requestor 1 is given priority, a request from requestor 1 will be granted regardless of the existence of any other requests. If however, requestor 1 is not making a request, IC6–IC9 function to choose the requestor which most closely succeeds requestor 1. That is, if requestor 2 is making a request, that request will be granted regardless of existance of any other requests. If requestors 1 and 2 are not requesting a memory access, a request from requestor 3 will be granted and so on.

On the next memory cycle, priority sequencer 28, having been incremented, functions to indicate to IC-6–IC9 that the next priority in the sequence has been attained, namely priority 2. During this memory cycle, requestor 2 will be given the highest priority. If requestor 2 is not making a request, requestor 3 will be selected if requesting an access and so on. After one of the requestors has been granted access to memory, priority sequencer is again incremented to the next priority, namely priority 3, and the process continues.

In this manner, priority is equally distributed among the seven requestors over time each of the requestors being allowed equal access to memory.

The firmware for achieving this rotating priority is quite simple but will be further described with reference to Tables 2 through 8 which illustrate the input/output functions of IC6–IC9. With reference to Table 2, priority 1 is defined as "0,1" state for address bits A8 and A7, respectively, IC6 and IC8 being enabled. Since the first requestor has the highest priority, that request will be granted regardless of the state of any other requestors, as illustrated in the first line of the input/output functions of IC6 and IC8. Specifically, when address bit A0 attains a low state, indicating that requestor 1 has made a request, acknowledge line ACK1 will go high to acknowledge requestor 1, regardless of the state of any of the other request lines A1–A6, as illustrated by the "don't care" conditions (x) at address inputs A6–A1. On the other hand, if address line A0 is high, indicating that requestor 1 is not making a request, but address line A1 is low indicating that requestor 2 is making a request, the request from requestor 2 will be granted regardless of the state of any higher ordered requestors 3–7 (A2–A6). In the event that neither requestors 1 nor 2 are requesting a memory access, requestor 3 (A2) will be given priority. Thus, if address bit A2 goes low, indicating that requestor 3 is making a request, as shown by the third line in Table 2, acknowledge line ACK3 will go high to grant the third requestor access. On line 7 of Table 2, it can be seen that requestor 7 (A6) will be acknowledged only when requestors 6 through 1 are not requesting memory. Finally, when no requests are made as indicated by a high level on each of the address bits, A6–A0, no request is acknowledged.

Although described in somewhat sequential terms, it can be seen that both IC6 and IC8 (as well as IC7 and IC9 in Tables 5–8) are programmed to respond substantially immediately to the input conditions defined by the address bits A0–A8, and that for any one of the seven rotating priorities, an acknowledgement (or lack therof) will quickly be granted on one of the acknowledge lines regardless of the priority or which requestor was selected.

If requestors 1 and 3 are requesting a memory access under priority 1 the address pattern shown on the top line of Table 2 will be produced by thereby acknowledge the first requestor. The high going acknowledge signal on acknowledge line ACK1 causes NAND gate 50a to pull the associated request/acknowledge line low when NOR gate provides a high signal to the other input of NAND gates 50a–50g, as will be described in more detail below. Upon the change of state of NOR gate 52 from a high to low level, IC10 in priority sequencer 28 is incremented since the output of NOR gate 52 is delivered to the clock input of IC10 via signal line 30. Thus, the next memory cycle will be "priority 2", requestor 2 being given the highest priority.

TABLE 2

| | | | | | | | | | PRIORITY 1 - IC6/IC8 | | | | | | |
|---|---|---|---|---|---|---|---|---|---|---|---|---|---|---|---|
| A8 | A7 | A6 | A5 | A4 | A3 | A2 | A1 | A0 | ACK1 | ACK2 | ACK3 | ACK4 | ACK5 | ACK6 | ACK7 |
| 0 | 1 | x | x | x | x | x | x | 0 | 1 | 0 | 0 | 0 | 0 | 0 | 0 |
| 0 | 1 | x | x | x | x | x | 0 | 1 | 0 | 1 | 0 | 0 | 0 | 0 | 0 |
| 0 | 1 | x | x | x | x | 0 | 1 | 1 | 0 | 0 | 1 | 0 | 0 | 0 | 0 |
| 0 | 1 | x | x | x | 0 | 1 | 1 | 1 | 0 | 0 | 0 | 1 | 0 | 0 | 0 |
| 0 | 1 | x | x | 0 | 1 | 1 | 1 | 1 | 0 | 0 | 0 | 0 | 1 | 0 | 0 |
| 0 | 1 | x | 0 | 1 | 1 | 1 | 1 | 1 | 0 | 0 | 0 | 0 | 0 | 1 | 0 |
| 0 | 1 | 0 | 1 | 1 | 1 | 1 | 1 | 1 | 0 | 0 | 0 | 0 | 0 | 0 | 1 |
| 0 | 1 | 1 | 1 | 1 | 1 | 1 | 1 | 1 | 0 | 0 | 0 | 0 | 0 | 0 | 0 |

X = Don't Care (Logic 1 or 0)

TABLE 3

| | | | | | | | | | PRIORITY 2 - IC6/IC8 | | | | | | |
|---|---|---|---|---|---|---|---|---|---|---|---|---|---|---|---|
| A8 | A7 | A6 | A5 | A4 | A3 | A2 | A1 | A0 | ACK1 | ACK2 | ACK3 | ACK4 | ACK5 | ACK6 | ACK7 |
| 1 | 0 | x | x | x | x | x | 0 | x | 0 | 1 | 0 | 0 | 0 | 0 | 0 |
| 1 | 0 | x | x | x | x | 0 | 1 | x | 0 | 0 | 1 | 0 | 0 | 0 | 0 |
| 1 | 0 | x | x | x | 0 | 1 | 1 | x | 0 | 0 | 0 | 1 | 0 | 0 | 0 |
| 1 | 0 | x | x | 0 | 1 | 1 | 1 | x | 0 | 0 | 0 | 0 | 1 | 0 | 0 |
| 1 | 0 | x | 0 | 1 | 1 | 1 | 1 | x | 0 | 0 | 0 | 0 | 0 | 1 | 0 |
| 1 | 0 | 0 | 1 | 1 | 1 | 1 | 1 | x | 0 | 0 | 0 | 0 | 0 | 0 | 1 |
| 1 | 0 | 1 | 1 | 1 | 1 | 1 | 1 | 0 | 1 | 0 | 0 | 0 | 0 | 0 | 0 |
| 1 | 0 | 1 | 1 | 1 | 1 | 1 | 1 | 1 | 0 | 0 | 0 | 0 | 0 | 0 | 0 |

TABLE 4

| | | | | | | | | | PRIORITY 3 - IC6/IC8 | | | | | | |
|---|---|---|---|---|---|---|---|---|---|---|---|---|---|---|---|
| A8 | A7 | A6 | A5 | A4 | A3 | A2 | A1 | A0 | ACK1 | ACK2 | ACK3 | ACK4 | ACK5 | ACK6 | ACK7 |
| 1 | 1 | x | x | x | x | 0 | x | x | 0 | 0 | 1 | 0 | 0 | 0 | 0 |
| 1 | 1 | x | x | x | 0 | 1 | x | x | 0 | 0 | 0 | 1 | 0 | 0 | 0 |
| 1 | 1 | x | x | 0 | 1 | 1 | x | x | 0 | 0 | 0 | 0 | 1 | 0 | 0 |
| 1 | 1 | x | 0 | 1 | 1 | 1 | x | x | 0 | 0 | 0 | 0 | 0 | 1 | 0 |
| 1 | 1 | 0 | 1 | 1 | 1 | 1 | x | x | 0 | 0 | 0 | 0 | 0 | 0 | 1 |
| 1 | 1 | 1 | 1 | 1 | 1 | 1 | x | 0 | 1 | 0 | 0 | 0 | 0 | 0 | 0 |
| 1 | 1 | 1 | 1 | 1 | 1 | 1 | 0 | 1 | 0 | 1 | 0 | 0 | 0 | 0 | 0 |
| 1 | 1 | 1 | 1 | 1 | 1 | 1 | 1 | 1 | 0 | 0 | 0 | 0 | 0 | 0 | 0 |

TABLE 5

| | | | | | | | | | PRIORITY 4 - IC7/IC9 | | | | | | |
|---|---|---|---|---|---|---|---|---|---|---|---|---|---|---|---|
| A8 | A7 | A6 | A5 | A4 | A3 | A2 | A1 | A0 | ACK1 | ACK2 | ACK3 | ACK4 | ACK5 | ACK6 | ACK7 |
| 0 | 0 | x | x | x | 0 | x | x | x | 0 | 0 | 0 | 1 | 0 | 0 | 0 |

TABLE 5-continued

| | | | | | | | | | PRIORITY 4 - IC7/IC9 | | | | | | |
|---|---|---|---|---|---|---|---|---|---|---|---|---|---|---|---|
| A8 | A7 | A6 | A5 | A4 | A3 | A2 | A1 | A0 | ACK1 | ACK2 | ACK3 | ACK4 | ACK5 | ACK6 | ACK7 |
| 0 | 0 | x | x | 0 | 1 | x | x | x | 0 | 0 | 0 | 0 | 1 | 0 | 0 |
| 0 | 0 | x | 0 | 1 | 1 | x | x | x | 0 | 0 | 0 | 0 | 0 | 1 | 0 |
| 0 | 0 | 0 | 1 | 1 | 1 | x | x | x | 0 | 0 | 0 | 0 | 0 | 0 | 1 |
| 0 | 0 | 1 | 1 | 1 | 1 | x | x | 0 | 1 | 0 | 0 | 0 | 0 | 0 | 0 |
| 0 | 0 | 1 | 1 | 1 | 1 | x | 0 | 1 | 0 | 1 | 0 | 0 | 0 | 0 | 0 |
| 0 | 0 | 1 | 1 | 1 | 1 | 0 | 1 | 1 | 0 | 0 | 1 | 0 | 0 | 0 | 0 |
| 0 | 0 | 1 | 1 | 1 | 1 | 1 | 1 | 1 | 0 | 0 | 0 | 0 | 0 | 0 | 0 |

TABLE 6

| | | | | | | | | | PRIORITY 5 - IC7/IC9 | | | | | | |
|---|---|---|---|---|---|---|---|---|---|---|---|---|---|---|---|
| A8 | A7 | A6 | A5 | A4 | A3 | A2 | A1 | A0 | ACK1 | ACK2 | ACK3 | ACK4 | ACK5 | ACK6 | ACK7 |
| 0 | 1 | x | x | 0 | x | x | x | x | 0 | 0 | 0 | 0 | 1 | 0 | 0 |
| 0 | 1 | x | 0 | 1 | x | x | x | x | 0 | 0 | 0 | 0 | 0 | 1 | 0 |
| 0 | 1 | 0 | 1 | 1 | x | x | x | x | 0 | 0 | 0 | 0 | 0 | 0 | 1 |
| 0 | 1 | 1 | 1 | 1 | x | x | x | 0 | 1 | 0 | 0 | 0 | 0 | 0 | 0 |
| 0 | 1 | 1 | 1 | 1 | x | x | 0 | 1 | 0 | 1 | 0 | 0 | 0 | 0 | 0 |
| 0 | 1 | 1 | 1 | 1 | x | 0 | 1 | 1 | 0 | 0 | 1 | 0 | 0 | 0 | 0 |
| 0 | 1 | 1 | 1 | 1 | 0 | 1 | 1 | 1 | 0 | 0 | 0 | 1 | 0 | 0 | 0 |
| 0 | 1 | 1 | 1 | 1 | 1 | 1 | 1 | 1 | 0 | 0 | 0 | 0 | 0 | 0 | 0 |

TABLE 7

| | | | | | | | | | PRIORITY 6 - IC7/IC9 | | | | | | |
|---|---|---|---|---|---|---|---|---|---|---|---|---|---|---|---|
| A8 | A7 | A6 | A5 | A4 | A3 | A2 | A1 | A0 | ACK1 | ACK2 | ACK3 | ACK4 | ACK5 | ACK6 | ACK7 |
| 1 | 0 | x | 0 | x | x | x | x | x | 0 | 0 | 0 | 0 | 0 | 1 | 0 |
| 1 | 0 | 0 | 1 | x | x | x | x | x | 0 | 0 | 0 | 0 | 0 | 0 | 1 |
| 1 | 0 | 1 | 1 | x | x | x | x | 0 | 1 | 0 | 0 | 0 | 0 | 0 | 0 |
| 1 | 0 | 1 | 1 | x | x | x | 0 | 1 | 0 | 1 | 0 | 0 | 0 | 0 | 0 |
| 1 | 0 | 1 | 1 | x | x | 0 | 1 | 1 | 0 | 0 | 1 | 0 | 0 | 0 | 0 |
| 1 | 0 | 1 | 1 | x | 0 | 1 | 1 | 1 | 0 | 0 | 0 | 1 | 0 | 0 | 0 |
| 1 | 0 | 1 | 1 | 0 | 1 | 1 | 1 | 1 | 0 | 0 | 0 | 0 | 1 | 0 | 0 |
| 1 | 0 | 1 | 1 | 1 | 1 | 1 | 1 | 1 | 0 | 0 | 0 | 0 | 0 | 0 | 0 |

TABLE 8

| | | | | | | | | | PRIORITY 7 - IC7/IC9 | | | | | | |
|---|---|---|---|---|---|---|---|---|---|---|---|---|---|---|---|
| A8 | A7 | A6 | A5 | A4 | A3 | A2 | A1 | A0 | ACK1 | ACK2 | ACK3 | ACK4 | ACK5 | ACK6 | ACK7 |
| 1 | 1 | 0 | x | x | x | x | x | x | 0 | 0 | 0 | 0 | 0 | 0 | 1 |
| 1 | 1 | 1 | x | x | x | x | x | 0 | 1 | 0 | 0 | 0 | 0 | 0 | 0 |
| 1 | 1 | 1 | x | x | x | x | 0 | 1 | 0 | 1 | 0 | 0 | 0 | 0 | 0 |
| 1 | 1 | 1 | x | x | x | 0 | 1 | 1 | 0 | 0 | 1 | 0 | 0 | 0 | 0 |
| 1 | 1 | 1 | x | x | 0 | 1 | 1 | 1 | 0 | 0 | 0 | 1 | 0 | 0 | 0 |
| 1 | 1 | 1 | x | 0 | 1 | 1 | 1 | 1 | 0 | 0 | 0 | 0 | 1 | 0 | 0 |
| 1 | 1 | 1 | 0 | 1 | 1 | 1 | 1 | 1 | 0 | 0 | 0 | 0 | 0 | 1 | 0 |
| 1 | 1 | 1 | 1 | 1 | 1 | 1 | 1 | 1 | 0 | 0 | 0 | 0 | 0 | 0 | 0 |

Table 3 illustrates the input/output function of IC6 and IC8 for priority 2, which is defined as an address pattern having a "1.0" sequence for A8 and A7, respectively, as also shown in Table 1. As shown on the first line of Table 3, if address bit A1 is low indicating that requestor 2 has requested a memory access, that request is acknowledged on acknowledge line ACK2 without regard to the states of the other requestors 1,3–7. If, however, requestor 2 is not requesting a memory access as indicated by a high level at address input A1, lines 2 through 8 of Table 3, the next highest requester which is making a request will be granted that request. As shown on line 7 of Table 3 requester 1 (A0) has the lowest priority in priority 2, and will only be acknowledges if requesters 2 through 7 (A1–A6) do not request a memory access. In the same example as used above, when requestors 1 and 3 are requesting a memory access, corresponding to the bit pattern shown on line 2 of Table 3, it can be seen that requestor 3 will be granted access on acknowledge line ACK3.

Again, at the end of the memory cycle providing priority 2, the change of state in NOR gate 52 causes the counter in IC10 in priority sequencer 28 to increment the priority to priority 3, Table 4, defined as having address bits A8 and A7 at high levels, IC6 and IC8 being enabled. In priority 3, requestor 3 will be given priority over all other requestors in a manner similar so that described with reference to priorities 1 and 2. A detailed description of priority 3 will therefore be omitted.

At the end of priority 3, IC10 in priority sequencer 28 is again incremented to provide priority 4, Table 5. With further reference to Table 1, it can be seen that the state QC is high to thereby enable IC7 and IC9, and disable IC6 and IC8. Priority 4 is thus provided when address bits A8 and A7 have the pattern "0,0", IC7 and IC9 being enabled. In priority 4, requestor 4 (A3) is given priority over all other requestors. In the above example, where only requestors 1 and 3 are requesting a memory access, corresponding to a bit pattern shown on line 5 of table 5, it can be seen that requestor 1 will be acknowledged on acknowledge line AK1.

Tables 6 through 8 indicate the programming of IC7 and IC9 to provide priorities 5 through 7 in a manner similar to that discussed for priorities 1 through 4. A detailed discussion of the operation of priorities 5 through 7 will therefore be omitted. It will generally be noted that Tables 2 through 8 provide the input/output function firmware for IC6-IC9. The priorities need only be determined by inputs bits A8 and A7, since the appropriate ICs will automatically be enabled for their respective priorities. Programming of IC6-IC9 may be achieved in any well known manner.

As will be discussed in more detail below, NOR gate 52 provides a high going signal level to NAND gate 50a-50g to allow the acknowledge signal to be applied to bus 12. However, the output of gate 52 will remain low if the refresh or "super priority" signals are high, to thereby prevent the acknowledge signal from propagating to bus 12 when higher priority requestor is requesting a memory access.

The present invention is further provided with circuitry for acknowledging and granting multi-cycle memory requests defined as memory requests which require more than a single memory cycle. Depending upon the purpose for which one of the requestors accesses the memory, the accessing requestor may wish to access memory, perform a processing routine based on the first memory access, and access memory after the processing routine has been terminated, without interruption. In order to accomplish this, the requestor produces a low-going multi-cycle signal which is applied to the multi-cycle multiplexer 32, request logic/memory 14, and priority sequencer 28. The low going multi-cycle signal causes multipelexer 32 to select the A inputs to IC3 and IC4 which correspond to acknowledge lines ACK1-ACK7. By applying the low-going multi-cycle signal to NAND GATE 42, latch circuit IC5 is prevented from changing state, and by applying the multi-cycle signal to the enable pins 7 and 10 of IC10 in priority sequencer 28, the priority will not be incremented by NOR gate 52.

The operation of the multi-cycle memory request will now be discussed. Assuming that a request has been made and granted, one of the acknowledge lines ACK-1-ACK7 will be high. Shortly after the request is granted, the associated requestor produces a low-going, multi-cycle signal to thereby apply the states of acknowledge lines ACK1-ACK7 to NAND gates 36a-36g via multiplexer 32. Since only one of the acknowledge lines is high, only the acknowledged requestor can be acknowledged in the subsequent memory cycle since only one of the NAND gates 36a-36g is enabled. Also, since the multi-cycle signal is applied to NAND gate 42, the states of the requestors from the previous memory cycle will be preserved. Further, since priority sequencer 28 cannot be incremented, the same input/output function will exist between request bus 20 and ROM 18 such that the previously acknowledged requestor will remain acknowledged by the associated one of the acknowledge lines ACK1-ACK7. Assuming that no refresh or super-priority requests were made, NOR gate 52 will only provide a high signal to NAND gates 50a-50g when the clock signal is low and a low signal is provided by flip-flop 44 at signal line 24. Immediately after the first request in a multicycle request is granted, NAND gate 38 goes low since all of the outputs of NAND gates 36a-36g achieve a high state. This can be seen since multiplexer 32 passes only one high signal to one of the NAND gates 36a-36g corresponding to the acknowledged requestor. Since the acknowledge/request line for the acknowledged requestor has been drawn low, (acknowledged) the other input of the associated one of NAND gates 36a-36g will be drawn low to provide a high level to the associated input NAND gate 38. Since NAND gate 38 provides a low level to the D input of flip-flop 44, the $\bar{Q}$ output from flip-flop 44 will go high with clock pulse T3, thereby producing a low output at NOR gate 52. NOR gate 52 will remain at a low level until the signal on line 24 goes low. The only way of achieving this condition is by awaiting the second request in the multi-cycle request from the previously acknowledged requestor. In response to the second request, the enabled one of NAND gates 36a-36g produces a low output which is applied to NAND gate 38, which in turn provides a high signal to flip-flop 44. In response thereto, flip-flop 44 provides a low signal on signal line with clock pulse T3, to thereby cause a high signal output at NOR gate 52, which in turn pulls the acknowledged one of NAND gates 50a-50g low to acknowledge the second multi-cycle request. The multi-cycle signal can then be removed to enable IC5, IC10, and to cause the multiplexer 32 to deliver the B inputs to request logic/memory 14 so that other requestors may subsequently be acknowledged.

The timing of the request/acknowledge and multi-cycle sequences will now be discussed with further reference to FIG. 4. Clock pulses T0-T3 are produced by timing circuitry in a well-known manner, the pulse width of each of the pulses T0-T3 being approximately 50 ns. To make a request, all requestors cause their associated request/acknowledge lines to go from low to high during the T1 clock pulse. Assuming that requestor 1 is requesting a memory access, the associated request/acknowledge line goes high at time TA as shown. In response thereto, the Q1 output from IC5 goes from high to low when gated by pulse T2 at time TB. Since the output of NAND gate 38 is in a high state, the Q output from flip-flop 44 goes from high to low in response to clock pulse T3 at time TC. A fixed amount of time T2 after receiving the output of IC5 from request bus 20, ROM 18 responds by changing the state of acknowledge line ACK1 from low to high, T2 corresponding to the access time of ROM 18. At time TD, all of the inputs to NOR gate 52 including the signal from flip-flop 44, the clock signal, and the refresh and super priority signals, assuming no such special requests are made, are low, thereby providing a high output from NOR gate 52. At this time, the one of NAND gates 50a-50g, having the associated acknowledge signal will go low, acknowledging the request.

Normally, the high to low transition of gate 52 would cause priority sequencer 28 to increment to the next priority. However, the acknowledged requestor has provided a low-going multi-cycle signal a short time after being acknowledged, to thereby indicate that the acknowledged request is for a multi-cycle access. The low going multi-cycle signal thus disables IC10 in priority sequencer 28 from incrementing at time TE as discussed above. The memory request arbitrator then waits until requestor 1 makes the next request. By selecting the A inputs to IC3 and IC4 in multiplexer 32, by disabling latch IC5 and by disabling counter IC10 in priority sequencer 28, the memory request arbitrator will only respond to the request from the requestor which had been previously acknowledged. This request may come at any time after the first cycle of the multi-cycle request.

When the requestor is ready to access memory for the second cycle of the multi-cycle request, the requestor provides the high going request signal on its associated request/acknowledge line during clock pulse T1, as shown at time TF. Around the same time, the multi-cycle signal may be removed from multiplexer 32, IC5 and IC10 by the requestor. The Q1 output from IC5 remains in a low state, while the Q output from flip-flop 44 goes low in response to clock pulse T3, at time TG. At time TH, all inputs to NOR GATE 52 are low to thereby drive the request/acknowledge line low to acknowledge the second request. Finally, at time TI, the priority sequencer 28 will be incremented in response to the high to low transition of gate 52.

While the preferred embodiments have been described in the foregoing specification, the scope of the invention shall be defined with reference to the following claims.

What we claim is:

1. In a system comprising a plurality of requestors for making simultaneous access requests to a common memory, a memory request arbitrator comprising: means for receiving a plurality of simultaneous access requests; means for generating a signal to assign relative priorities to each of such requests; means for selecting the request with the highest priority level; means cooperating with said means for selecting for overriding said priority selection in response to super priority requests; and, means for changing the relative priority of each requestor, said means for changing being responsive to a periodically generated signal to rotate the highest priority so that each requestor is assigned the highest priority over a given period of time.

2. A system in accordance with claim 1 wherein the means for selecting is a read-only memory.

3. In a system comprising a plurality of requestors for making simultaneous access requests to a common memory, a memory request arbitrator comprising: sequencing means for providing a sequence output identifying the requestor having the highest priority; selection means for receiving both said sequence output and request signals from said requestors and for providing a selection signal to a selected one of said requestors based on the relative priorities of active requestors; and, means for updating the relative priority of each requestor, said means for updating being responsive to a periodically generated signal to change the relative priorities such that the highest priority is assigned to each requestor over a given time period.

4. In a system comprising a plurality of requestors for making simultaneous access requests to a common memory, a memory request arbitrator comprising: sequencing means for providing a sequence output indicating which of said requestors has the highest priority; programable memory means having an address input comprised of request signals from said requestors and said sequence output, and having a data output for providing a selection signal to a selected one of said requestors based on the relative priorities of active requestors; and, means for incrementing said sequencing means, said means for incrementing being responsive to a periodically generated signal to change the relative priorities such that the highest priority is assigned to each requestor over a given time period.

* * * * *